(12) United States Patent
Barbashin et al.

(10) Patent No.: US 11,367,060 B1
(45) Date of Patent: Jun. 21, 2022

(54) COLLABORATIVE VIDEO NON-FUNGIBLE TOKENS AND USES THEREOF

(71) Applicant: Creator Proof LLC, Los Angeles, CA (US)

(72) Inventors: Igor Barbashin, Vancouver (CA); Raymond R. Lee, Los Angeles, CA (US); Cole A. Mason, Los Angeles, CA (US)

(73) Assignee: CREATOR PROOF LLC, Los Angeles, CA (US)

( * ) Notice: Subject to any disclaimer, the term of this patent is extended or adjusted under 35 U.S.C. 154(b) by 0 days.

(21) Appl. No.: 17/398,350

(22) Filed: Aug. 10, 2021

(51) Int. Cl.
| | |
|---|---|
| *G06Q 20/12* | (2012.01) |
| *G06Q 20/32* | (2012.01) |
| *G06Q 20/36* | (2012.01) |
| *G06Q 20/38* | (2012.01) |
| *G06Q 30/02* | (2012.01) |
| *G06Q 30/08* | (2012.01) |

(Continued)

(52) U.S. Cl.
CPC ......... *G06Q 20/1235* (2013.01); *G06F 16/13* (2019.01); *G06Q 20/3276* (2013.01); *G06Q 20/3676* (2013.01); *G06Q 20/389* (2013.01); *G06Q 30/0201* (2013.01); *G06Q 30/08* (2013.01); *H04L 9/3213* (2013.01); *H04L 9/3239* (2013.01); *H04N 21/2743* (2013.01); *H04L 2209/38* (2013.01)

(58) Field of Classification Search
CPC ........... G06Q 20/1235; G06Q 20/3276; G06Q 20/3676; G06Q 20/389; G06Q 30/0201; G06Q 30/08; G06F 16/13; H04L 9/3213; H04L 9/3239; H04L 2209/38; H04N 21/2743

USPC ........................................................ 705/68
See application file for complete search history.

(56) References Cited

U.S. PATENT DOCUMENTS

| | | | |
|---|---|---|---|
| 2020/0111068 A1* | 4/2020 | Scarselli | G06Q 20/203 |
| 2021/0035246 A1* | 2/2021 | Schouppe | H04L 9/3239 |

(Continued)

OTHER PUBLICATIONS

Barnes, "Art Blocks", Open Sea Blog, Mar. 11, 2021, 8 pages (Year: 2021).*

(Continued)

*Primary Examiner* — James D Nigh
(74) *Attorney, Agent, or Firm* — Baker Botts L.L.P.

(57) ABSTRACT

One example computer-implemented collaborative NFT method involves receiving and digitally storing a set of files, each file comprising digital content; programmatically associating the set of files with a corresponding unique project identifier; receiving digital input specifying a final digital composition comprising information from the set of files; digitally storing the final digital composition as a digital object in a database; receiving digital input specifying an allocation of authorship shares representing a distribution of ownership rights in the digital object; minting, on a blockchain, an NFT comprising a reference to the digital object; creating, on the blockchain, a smart contract specifying a fractional ownership of the digital object, the smart contract comprising a pointer to a metadata file associated with the NFT, the metadata file comprising one or more links to one or more corresponding digital assets associated with the NFT, each digital asset comprising a representation of the NFT.

18 Claims, 5 Drawing Sheets

(51) Int. Cl.
    *G06F 16/13*     (2019.01)
    *H04L 9/32*     (2006.01)
    *H04N 21/2743*     (2011.01)

(56) References Cited

U.S. PATENT DOCUMENTS

| | | | |
|---|---|---|---|
| 2021/0150626 A1* | 5/2021 | Robotham | H04L 63/0442 |
| 2021/0174432 A1* | 6/2021 | Gonnaud | G06Q 30/08 |
| 2021/0279695 A1* | 9/2021 | Rice | G06Q 30/0239 |
| 2021/0281410 A1* | 9/2021 | Hain | G06Q 20/065 |

OTHER PUBLICATIONS

EIP-721: Non-Fungible Token Standard, Ethereum Improvement Proposals, https://eips.ethereum.org/EIPS/eip-721, Jan. 1, 2018, 18 pages (Year: 2018).*

Nadini et al., Mapping the NFT revolution, www.nature.com/scientificreports, Oct. 23, 2021, 12 pages (Year: 2021).*

Hugo P, Physical NFT Art, or physical Art NFT, https://nonfungible.com/blog/physical-nft-art-or-physical-art-nft, 11 pages, Jun. 21, 2021 (Year: 2021).*

DealHQ Partners, Understanding Non-Fungible Tokens (NFTs), https://legal.businessday.ng/2021/06/10/understanding-non-fungible-tokens-nfts/, 7 pages, Jun. 9, 2021 (Year: 2021).*

* cited by examiner

US 11,367,060 B1

COLLABORATIVE VIDEO NON-FUNGIBLE TOKENS AND USES THEREOF

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Creator Proof LLC.

TECHNICAL FIELD

One technical field of the disclosure is computer-implemented processing of encrypted digital objects known as Non-Fungible Tokens (NFTs). Another technical field is smart contracts, including smart contracts that govern the authorship or ownership of digital objects. Another technical field is blockchain technology for processing transactions involving creative works. Another technical field is collaborative digital content creation, composition, editing, storage, sales, and distribution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern technology enables the creation and sharing of a vast array of digital content with an unprecedent number of consumers, allowing artists to reach audiences spread across the globe. But in the internet's viral content ecosystem, content creators may face difficulties in monetizing, or even receiving credit for, their creations. Unlike physical objects which may be associated with a higher cost of creation and distribution, digital objects like videos, music, digital imagery, electronic text, and other digital content may be copied and distributed widely and rapidly in channels outside of the content creator's control. Thus, content creators face great challenges in maintaining sovereignty over their digital creative works.

These challenges are exacerbated when content creators desire to collaborate together to produce digital creative works. In these situations, it may be difficult for content creators to establish provenance in a composition in a way that reflects the varied types and levels of contribution made by the various authors of the work. For example, when a viral video takes over the internet, it is rare to see all the content creators involved receive credit, much less profit, for their respective contributions. In a single video, one creator may have furnished a remixed song heard in the background, while another artist lip-syncs, a third artist dances, and a fourth, unseen, contributor, fused the content together and produced the video—not to mention that the video is titled with a celebrity's trademarked catchphrase.

On the other hand, content consumers face another set of challenges due to the lack of a collaborative provenance in digital works. First, consumers may have trouble verifying the authenticity of a piece of digital content, particularly in a world featuring the possibility of deep-fakes and opportunistic misappropriation of intellectual property. Second, consumers may feel like they can never truly own a composition. And third, consumers that feel gratitude toward the creators of a composition may have difficulty in expressing their gratitude and support for content creators through tips or monetary gifts: in many cases the lack of provenance may prevent the diverse content creators from even being identified by the consumer.

If a solution could be developed that addressed the aforementioned issues, then it would represent a significant advance in the state of the art.

SUMMARY

The appended claims may serve as a summary of the invention.

DETAILED DESCRIPTION

Figure 1:
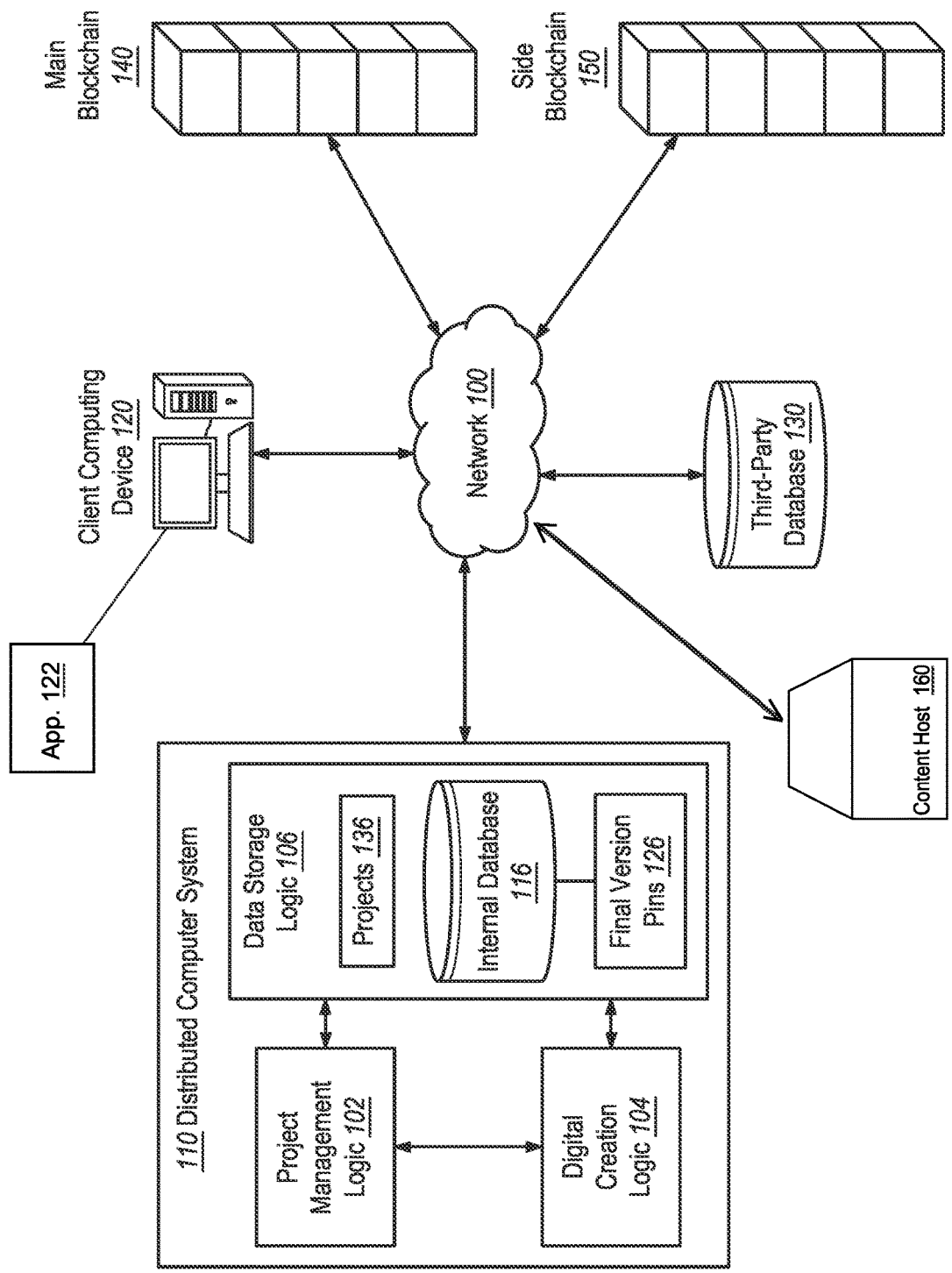
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein. As is conventional for patent disclosures, this disclosure does not describe and is not required to describe the details of foundation technology that are expected to be within the knowledge of a person having ordinary skill in the art to which this disclosure is directed, such as computer-implemented encryption, blockchain technology, non-fungible tokens (NFTs) in their conventional usage, internetworking, programming graphical user interfaces, and the like.

Embodiments are described in sections below according to the following outline:
1. General Overview
2. Structural & Functional Overview
   2.1 Collaboration
   2.2 Minting a Collaborative NFT
      2.2.1 Smart Contracts
      2.2.2 Digital Animated Frames
   2.3 Auctioning a Collaborative NFT & Transfers of Ownership
   2.4 Monetization
   2.5 Gamification
3. Implementation Example—Hardware Overview 1. General Overview In an embodiment, the disclosure provides computer-implemented systems and methods for creating a collaborative Non-Fungible Token (NFT) that provides proof of ownership of a digital object. The collaborative NFT is itself a digital object that is created programmatically and digitally stored. The collaborative NFT may represent the collective efforts of computers under the control of a group of content creators in the creation of the digital object. The collaborative NFT may also be referred to as a collective NFT.

In some embodiments, an authorship contract, which may be a smart contract, comprises pointers to one or more NFTs which may be collaborative NFTs. In an embodiment, the smart contract that handles an NFT stores a global template of a uniform resource identifier (URI) that points to an NFT metadata file, such as a json metadata file. Each NFT metadata file may comprise one or more links to digital assets of the NFT, including representations of the NFT.

In an embodiment, a smart contract and related collaborative NFT(s) may exist together on the same blockchain or on different blockchains. In one embodiment, the ETHEREUM blockchain is used for managing smart contracts and collaborative NFTs. Embodiments may be compatible with the ERC-721 open standard.

In an embodiment, a collaborative NFT may be stored on a blockchain, the NFT comprising a pointer to a digital object stored in a data storage system such as an InterPlanetary File System (IPFS). The digital object may comprise an audiovisual program a video file, an audio file, digital image(s), or electronic text or documents. The NFT may also comprise a pointer to a digital animated frame that may be associated with a level of rarity, popularity, status, or prestige. When the digital object is viewed by a user on a website using a viewing program or rendering program, the digital object may be graphically displayed inside the digital animated frame. The frame may dynamically update based on the popularity of the digital object defined by a number of views or likes that are received in real-time from other accounts or users via a programmed application, or by a metric other than views or likes.

Some embodiments are programmed to implement gamification of NFTs, including through use of the digital animated frame. Embodiments may also offer a Geo-NFT that may be obtained based on an account holder, user or individual, with a mobile computing device that is executing a compatible web app or mobile app, visiting a location in the physical world during a period of time in which the mobile computing device records the location, for example using a location service of the mobile device operating system, and transmits location data to a server computer. A Geo-NFT may be obtained by a user scanning a QR code with the mobile computing device, or by geofencing.

Some embodiments are programmed to implement a Mystery NFT. In an embodiment, a related digital object is not unveiled until after a user account completes the purchase or receipt of the Mystery NFT, or until a set period of time has passed, or a until a specified date occurs.

In an embodiment, a computer-implemented method of creating a collaborative non-fungible token (NFT) involves: receiving and digitally storing a set of files uploaded by a plurality of users, each file comprising digital content; programmatically associating the set of files with a corresponding unique project identifier; receiving, from a user of the set of users, digital input specifying a final digital composition comprising information from at least one file of the set of files associated with the unique project identifier; digitally storing the final digital composition as a digital object in a database; receiving digital input from the plurality of users specifying an allocation of authorship shares, the allocation of authorship shares representing a distribution of ownership rights in the digital object; minting, on a blockchain, a non-fungible token comprising a reference to the digital object; creating, on the blockchain, a smart contract specifying a fractional ownership of the digital object according to the allocation of authorship shares, the smart contract comprising a pointer to a metadata file associated with the non-fungible token, the metadata file comprising one or more links to one or more corresponding digital assets associated with the non-fungible token, each digital asset comprising a representation of the non-fungible token.

An embodiment may involve auctioning the NFT online and transferring ownership of the NFT, the NFT being minted according to the ERC-721 open standard and the NFT and the smart contract being recorded as transactions on an ETHEREUM blockchain.

An embodiment may involve associating the digital object with an animated digital frame within which the digital object may be viewed online, the metadata file associated with the NFT comprising a link to the animated digital frame.

In an embodiment, the one or more digital assets may include at least one of a digital video of the digital object being displayed inside the frame or a gif animation comprising video frames of the digital video.

An embodiment may involve the animated digital frame being programmatically configured to dynamically update based on a popularity of the digital object defined by popularity metadata associated with the digital object, the popularity metadata being related to at least one of a number of views or a number of likes of the digital object on a content host, the popularity metadata being received responsive to one or more automatic API calls to the content host.

An embodiment may involve the smart contract being associated with a plurality of NFTs that reference the digital object, and the smart contract comprising a pointer to each of the plurality of NFTs.

An embodiment may involve the NFT being obtainable only by a user that presently inhabits or previously inhabited a particular location in the physical word during a specified time period.

An embodiment may involve determining that the user presently inhabits or previously inhabited the particular location during the specified time period using a method comprising at least one of geofencing or the user scanning a QR code.

An embodiment may involve the NFT being viewable online only after the occurrence of a specified time-based trigger.

An embodiment may involve storing payments, less a commission, related to the auctioning of the NFT and any subsequent resales of the NFT in the smart contract; and, pulling, by a user of the plurality of users, personal payments from the smart contract to a personal cryptocurrency wallet associated with the user based on the user's fractional ownership of the NFT specified by the smart contract.

2. Structural & Functional Overview

In an embodiment, an online distributed computer system or platform for digital content production provides a system for collaborating on the composition of a digital object. In an embodiment, the platform is programmed to execute minting a collaborative NFT that specifies ownership of the digital object, forming a related smart contract that specifies authorship of the digital object, auctioning the NFT, transferring ownership of the NFT, and retrieving payments related to sales or royalties derived from the collaborative NFT.

In embodiments, a user of the platform having a user computing device creates a user account associated with a login, a password, and a unique display name associated with a personal profile. User accounts may be created by using a browser on a user computing device to connect via a network and/or internetworks to a server instance or server computer that hosts and executes a web application that is programmed to implement the functions that are described herein. The web application may be programmed to serve a personal profile page that comprises data items retrieved from an online database including one or more of a profile picture, a biography, a list of followers, a list of followed users, the creations of the user, the collections of the user, the badges of the user, the wallet of the user, and the current bids of the user on NFTs or collaborative NFTs. When the user views a profile of a content creator, they may see a subset of the aforementioned data items.

FIG. 1 illustrates a distributed computer system showing the context of use and principal functional elements with which one embodiment could be implemented. In an embodiment, distributed computer system 110 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1, for one embodiment, depicts a distributed computer system 110 coupled via network 100 to a client computing device 120, a third-party database 130, a main blockchain 140, a side blockchain 150, and a content host 160. In some instances, some of the depicted components may be communicatively coupled via a network 100 without the distributed computer system 110 positioned as an intermediary.

In an embodiment, computer system 110 is programmed to execute the functions described herein and related to automatic management of digital content items of a plurality of content creators and collaboration between groups of two or more content creators, as further described in other sections herein. Distributed computer system 110 may comprise one or more processors, cores, clusters, computers, servers, and/or virtual machine instances, hosted or executing in an enterprise, private datacenter, public datacenter and/or cloud computing service.

In some embodiments, the client computing device 120 may be a smartphone, laptop computer, desktop computer, tablet, or any other type of computing device comprising one or more hardware processors or processor cores. In one embodiment, client computing device 120 hosts and executes a client application or app 122, which the client computing device may download and install from computer system 110, an application store, or other repository. The app 122 is compatible with computer system 110 and communicates with the computer system using an app-specific protocol, parameterized HTTP POST and GET requests, and/or other programmatic calls. In some embodiments, app 122 comprises a conventional internet browser application that is capable of communicating over network 100 to other functional elements via HTTP and capable of rendering dynamic or static HTML, XML, or other markup languages, including displaying text, images, accessing video windows and players, and so forth.

In embodiments, the third-party database 130 may be an FTP site, cloud storage system, relational database, data lake, or other electronic digital system programmed for data storage, querying, and retrieval. In embodiments, the third-party database 130 is an InterPlanetary File System (IPFS). Database 130 may comprise networked storage in private or public cloud storage systems, file sharing systems, network attached storage, and so forth.

The main blockchain 140 and side blockchain 150, in one embodiment, are implemented using ETHEREUM blockchain technology, but other embodiments may use other kinds of blockchain technology. In embodiment, the side blockchain 150 has lower transaction costs than the main blockchain 140; the side blockchain 150 may have zero or de minimis transaction costs.

In an embodiment, the content host 160 is a social media content sharing computer, service or website that is programmed to receive, store and host audiovisual programs, such as short-form user-created videos that are uploaded to content host 160 from mobile computing devices, desktop computers, or other devices. Presently known commercial examples include TIKTOK and INSTAGRAM, but other embodiments may use functionally equivalent or functionally similar services of other providers. A video, audiovisual program or recording, or other digital content item that the content host 160 hosts may be associated with metrics, such as a number of views or likes associated with the video, that are digitally stored in tables of the database 130, main memory of the computer system 110, or internal database 116. Metrics of this type may be obtained using programmatic means such as API calls, parameterized HTTP POST or GET requests, or calls or method invocations in application-specific protocols. In embodiments, digital content items that are uploaded to distributed computer system 110 may be automatically published to a content host 160. In embodiments, a link or pointer to digital content hosted by a content host 160, or the digital content itself, may be uploaded to distributed computer system 110 and stored in internal database 116 or third-party database 130.

In one embodiment, distributed computer system 110 comprises project management instructions or logic 102 that are programmed to interoperate with digital creation logic 104 and data storage logic 106 to execute the functions that are described herein. In an embodiment, instructions executed at distributed computer system 110 are organized as a web application which app 122 accesses via HTTP.

In an embodiment, when a user account uploads digital content items to computer system 110 from a client computing device 120, project management logic 102 is programmed to assign the digital content item to a particular project 136, which may have a unique project identifier (ID). The data storage logic 106 is programmed, in response, to cause the uploaded content to be stored in third-party database 130 or an internal database 116. The internal database 116 may an FTP site, cloud storage, relational database, data lake, or other system for data storage.

In some embodiments, project management logic 102 is programmed with user enrollment and account creation instructions that respond to input signals from client computing device 120 requesting to create a new user or account. In some embodiments, a request of a client computing device 120 to create a new user or account is transmitted with an electronic mail address or other unique identifier of a user or account, and in response, project management logic 102 is programmed to call an API of an external system to validate the user identifier and/or obtain security credentials for the user or account. Or, in some embodiments in which third-party systems do not provide usable credentials, user requests may be manually checked. For example, a new user may transmit a registration request that specifies a username that has been previously created in a third-party service such as TIKTOK. In response, project management logic 102 is programmed to generate a pseudo-randomly generated integer verification code, and to transmit a response message to the user instructing the user to add the verification code to their TIKTOK biography for manual verification by an administrator associated with distributed computer system 110 or an owner or operator of the system. The same method of verification may be used to ensure video requests are honored by a collaborator.

In an embodiment, data storage logic 106 is programmed for determining where data should be stored, for causing data to be stored and backed-up, and for executing transactions on the main blockchain 140 and the side blockchain 150. The project management logic 106 is programmed to implement version control and access control for files related to projects 136, including versions of compositions and contributed video, audio, digital imagery, and electronic text files. In embodiments, digital files related to challenges or broadcasts may be associated with projects 136 and stored in the internal database 116, the third-party database 130, or in another data storage system.

In an embodiment, the data storage logic 106 programmatically interoperates with digital creation logic 104. In an embodiment, the digital creation logic 104 is programmed to process files related to the creation of digital objects by content creators. A user account associated with the client computing device 120 may interactively use the digital creation logic 104 to create, produce, or mix digital content items for projects 136. The digital creation logic 104 is programmed, in various embodiments, to implement video editing tools, sound editing tools, image editing tools, text editing tools, markup tools, post-production tools, file compression or editing tools, metadata editing tools, tools for creating subtitles or closed captioning (CC), or other digital editing, production, remixing, or publication tools.

In an embodiment, when an NFT is about to be minted, the project management logic 102 is programmed to interoperate with the data storage logic 106 to store final version pins 126 of the associated digital content in the internal database 116. The final version pins 126 may act as a backup for digital content sent to a third-party database 130, such as IFPS, during the minting process. The project management logic 102 is programmed to cause the creation of a smart contract as the minting process for an NFT completes, or at some point beforehand, the smart contract reflecting the collaborative or sole authorship of the NFT. In an embodiment, distributed computer system 110 executes instructions programmed to create the smart contract that handles an NFT, the NFT storing a global template of a uniform resource identifier (URI) that points to a corresponding NFT metadata file, such as a json metadata file. Each NFT metadata file may comprise one or more links to digital assets of the NFT, including representations of the NFT. These assets may comprise digital image assets, digital 3D-model assets, or digital video assets.

Figure 2:
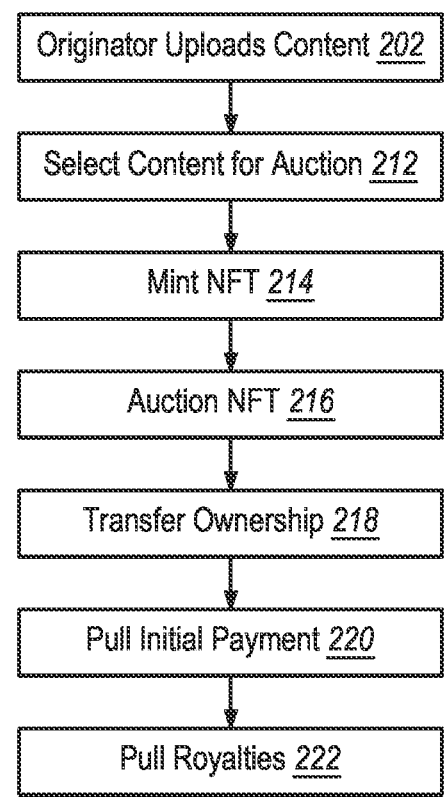
FIG. 2 illustrates an example programmed process for Non-Fungible Token creation and monetization from a content creator perspective, in an embodiment.

FIG. 2 illustrates an example process for Non-Fungible Token creation and monetization from a content creator perspective, in an embodiment.

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

A content creator may be designated as an "originator" because they are a source of original content or a "producer" as they may be in charge of producing a final composition through collaboration with other content creators. On the platform, an originator may decide to maintain full ownership and control of his or her digital content or to collaborate with other content creators to produce a composition.

In FIG. 2, in an embodiment, a Non-Fungible Token creation and monetization method 200 begins at step 202, in which the process is programmed to facilitate uploading of digital content. In an embodiment, a content creator uploads digital content by communicating with the distributed computer system 110 using the client computing device 120. The uploaded content may be stored, for example, in third-party database 130 or internal database 116. Uploaded content may comprise audiovisual programs, video files, audio files, digital images, electronic documents, and so forth.

In embodiments, method 200 is programmed to pass control from step 202 to step 212 if the originator desires to maintain full ownership and control of some digital content and does not wish to collaborate and transform at least one piece of uploaded content. At step 212, the process is programmed to receive a selection, from a user computer, of digital content for auction. The selection may include one or more uploaded content items that the creator may remix or combine using programmed tools provided by the digital creation logic 104. The content may be a video, music, digital imagery, electronic text, or other digital content.

In response to the selection of content for auction, the project management logic 102 is programmed to assign the selected content to a project 136 which may have a unique project ID. The process is programmed to receive, from the originator, a description or other related data for the digital content of the project which the process is programmed to associate certain metadata with the project, including content type metadata. The process is programmed to receive from the originator certain parameters for the auction, which may include a starting date, a completion date, a starting price, or other parameters. Once the originator is satisfied with the selection of digital content, they may provide digital input to initiate the NFT minting process and the auction according to the set parameters and the method 200 is programmed to receive the digital input.

In embodiments, method 200 is programmed to progress from step 212 to step 214, in which an NFT is minted. To mint an NFT, the method is programmed to write an immutable transaction to a node of a blockchain, in which the node references the digital object that the originator prepared for auction. The digital object may be stored in the third-party database 130 or another data storage system. The NFT may be minted in compliance with the ERC-721 protocol. The minting process is described further herein in other sections, including in section 2.2. The authorship of the digital object may be specified by a smart contract as described further herein, including in section 2.2.1. The digital object may be associated with a dynamic digital animated frame as described further herein, including in section 2.2.2.

In embodiments, method 200 is programmed to progress from step 214 to step 216, in which the method is programmed to auction the NFT online by the platform. Method 200 may be programmed to execute digital auctions using a plurality of sub steps such as the following, all of which may be supported using appropriate graphical user interfaces and sequences of digital messages between the platform and user computing devices. Digital bids may be placed for ownership of the NFT. The platform may provide a user with a cryptocurrency wallet when the user establishes an account on the platform, the wallet being associated with a unique user ID of the user. The winning bidder may pay for the NFT with cryptocurrency from their wallet or with another form of currency. In some embodiments, the auction is actually a sale and the first user signifying a willingness to pay the listing price of the NFT is able to buy the NFT.

In embodiments, method 200 is programmed to progress from step 216 to step 218, in which ownership of the NFT is transferred to the winning bidder of the auction. A transfer of ownership may comprise a transaction being recorded on the blockchain specifying that the winning bidder is the owner of the NFT. Depending on the terms of the auction, the transfer of ownership of the NFT may or may not comprise the transfer of copyrights in the corresponding digital object or any other rights. The transfer of ownership may occur concurrently with the payment, including by using a smart contract.

In embodiments, method 200 is programmed to progress from step 218 to step 220, in which the originator may pull an initial payment from the platform. When the auction concludes, the payment or an equivalently valued amount of cryptocurrency may be deposited in a smart contract associated with the NFT, the smart contract existing on the same blockchain as the NFT. The platform may set aside a pre-determined amount of the payment as a commission to the platform, which may be 5% or another amount. The originator may then pull the proceeds from the smart contract to his or her cryptocurrency wallet by interacting with a user interface that the platform is programmed to provide. An operator of the platform may pull the commission to a platform wallet, or it may be done automatically by the platform.

In embodiments, method 200 is programmed to progress from step 220 to step 222 when there is a resale of the NFT. In such cases, the originator may receive a royalty, such as a 10% royalty or another royalty amount with respect to the resale price. The royalty may be deposited in the same smart contract associated with the NFT, and the originator may similarly pull the royalty amount from the smart contract to his or her cryptocurrency wallet. The platform may similarly receive a 5% commission on the resale, based on the resale price. The operator of the platform may pull the resale commission to the platform wallet or it may be done automatically by the platform.

2.1 Collaboration

In embodiments, the "originator" may desire to collaborate with other content creators to create a collaborative NFT. Each collaborating content creator may use their own skillset to add something to the overall composition of the digital object. For example, one content creator may provide a song, another might dance, and a third might edit the song and dance together and supply subtitles to the mix. A "producer" (who may or may not be the originator) may remix content into intermediate or final versions.

Figure 3:
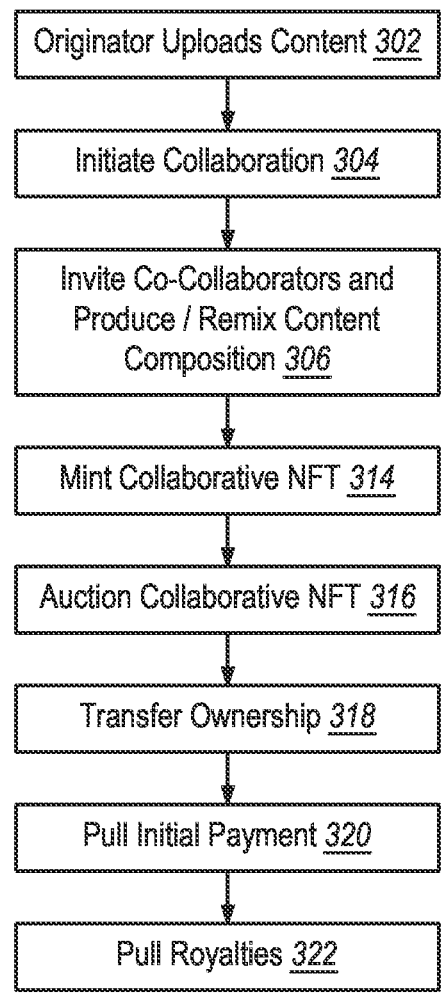
FIG. 3 illustrates an example programmed process for collaborative Non-Fungible Token creation and monetization from a content creator perspective, in an embodiment.

FIG. 3 illustrates an example process for collaborative Non-Fungible Token creation and monetization from a content creator perspective, in an embodiment.

In FIG. 3, in an embodiment, a collaborative Non-Fungible Token creation and monetization method 300 is programmed to begin at step 302, at which point a content creator ("originator") uploads digital content by communicating with the distributed computer system 110 using the client computing device 120, and wherein the originator concurrently or subsequently desires to collaborate with other content creators. For example, distributed computer system 110 may execute project management logic 102 programmed to prompt the content creator to upload digital media content by transmitting control instructions to client computing device 120 or app 122. The uploaded content may be stored, for example, in third-party database 130 or internal database 116.

In embodiments, responsive to uploading content or another trigger, an originator may be programmatically prompted with suggestions of other content creators that the creator may wish to collaborate with. These suggestions may be based on criteria which may include a likelihood of a successful collaboration or other criteria. A collaboration may be deemed likely to succeed if the collaboration would likely improve the popularity or status of the two or more content creators, based on a likely marginal increase of views, likes, followers, or another metric compared to a predicted baseline. The likelihood of success may be determined by a machine learning algorithm operating on a graph, wherein content types and creators are nodes on the graph and an increase in followers is modeled as a flow from one creator node to another creator node.

In an embodiment, method 300 is programmed to progress from step 302 to step 304, wherein the originator initiates a collaboration. For example, distributed computer system 110 may receive input specifying a desire to initiate a collaboration from client computing device 120 or app 122. In some embodiments, the originator has the sole power to produce the digital object, or to invite co-collaborators, or to remove other collaborators from the project, or to determine when a composition is complete and ready for minting. In other embodiments, one or more of the aforementioned powers is shared with the other collaborators via consensus. For example, some powers may require unanimous consent of the current collaborators to exercise, while others may require a simple majority. As explained herein, the platform may suggest other content creators to the originator who may make good co-collaborators, including by using methods involving artificial intelligence.

Figure 4:
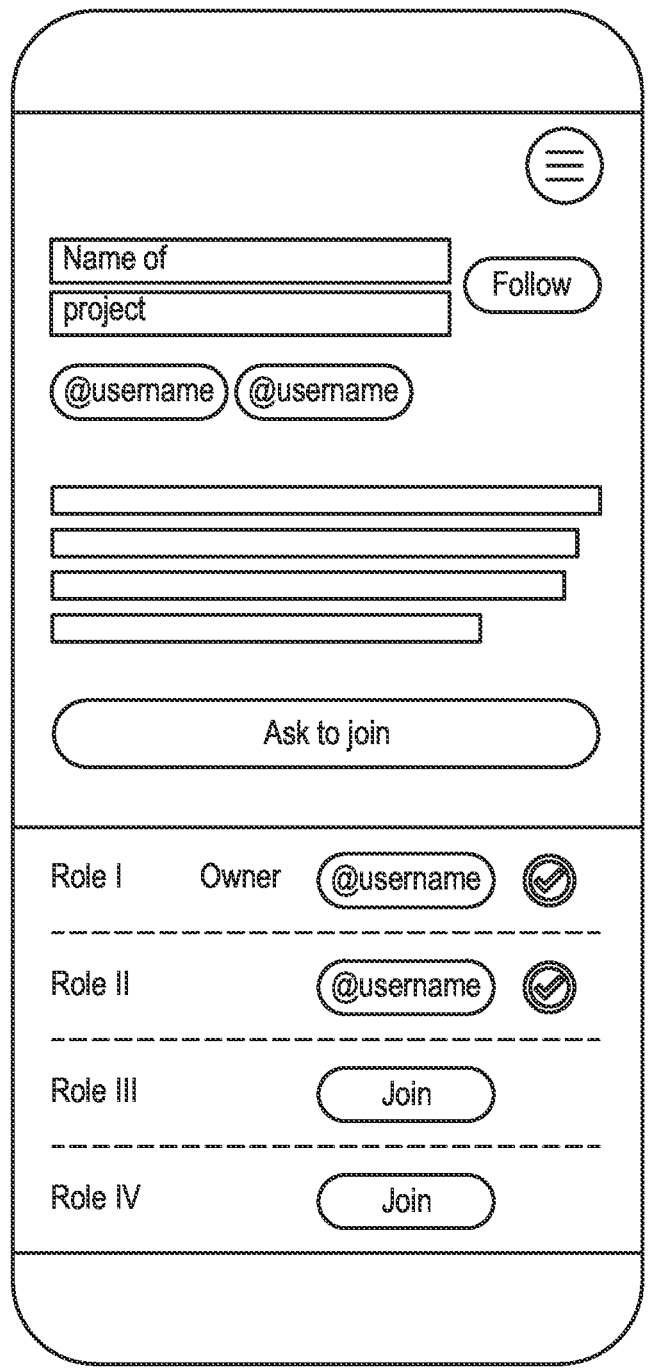
FIG. 4 illustrates an example user interface for a collaboration page that a platform user may use to ask to join a collaborative project, in an embodiment.

In certain embodiments, the platform may be programmed to allow users to view some already initiated collaborations that are set for public viewing. FIG. 4 illustrates an example user interface for a collaboration page that a platform user may use to ask to join a collaborative project, in an embodiment. Collaborations may have certain roles specified on a collaboration page, wherein each role may be associated with one or more certain types of content creation. In embodiments, a content creator may apply to join a collaboration to fill a particular open role and the originator and/or the other co-collaborators may accept or reject the applying content creator's application.

In embodiments, each collaborator has voting power equal to the number of shares owned in the project for making decisions about the project. In an embodiment, the originator starts with 1,000 shares and offers shares to other content creators for the other content creators to join the collaboration and contribute to the project. The shares granted may be proportional to the creative contributions that the invited content creator is expected to make to the composition. In embodiments, a content creator's shares are directly proportional to the amount of revenue the content creator while receive from future auctions, sales, and royalties derived from a future NFT associated with the digital object embodying the composition. In some embodiments, voting rights may be decoupled from revenue rights and there may be special classes of shares that provide enhanced or diminished voting rights relative to a content creator's portion of shares compared to the total number of shares in the project. In some embodiments, permission of all current content creators in a project is required to add or remove another collaborator from the project. In embodiments, the allocation of shares is handled through a smart contract associated with the project, the smart project being created when the collaboration is initiated or at another point in time. The distribution of shares pursuant to a smart contract may take place on the side blockchain 150 which may have lower transaction costs than the main blockchain 140.

In FIG. 3, in an embodiment, method 300 is programmed to progress from step 304 to step 306, at which point the originator or current collaborators may be prompted by the platform to invite co-collaborators and produce/remix the content composition. For example, distributed computer system 110 may execute project management logic 102 programmed to prompt the originator or current collaborators to invite co-collaborators by transmitting control instructions to client computing device 120 or app 122. The platform may provide a digital interface associated with the project where each co-collaborator may upload digital content, access digital content uploaded by co-collaborators, and view, produce, or upload versions of a content composition. When the originator or a co-collaborator uploads content (digital files) to the platform from a client computing device 120, the project management logic 102 may assign the content to particular project 136 which may be associated with a unique project ID.

In embodiments, only the originator may produce an intermediate or final version of a composition from digital files uploaded by him or herself and the other co-collaborators. In embodiments, the originator may instead designate one or more producers, or each co-collaborator may have producer powers which allow that content creator to produce intermediate or final versions. Each collaborator may access platform-provided tools managed by the digital creation logic 104 to produce or edit digital content or may use their own tools and then upload the created or edited content to the platform. In embodiments, once the composition is complete, a digital object is finalized and a corresponding NFT is prepared for minting. The minting process may only begin once there is a consensus among the co-collaborators that the creative process has concluded or based on a different kind of public project criteria, such as by the sole approval of the originator.

2.2 Minting a Collaborative NFT

In an embodiment, method 300 is programmed to progress from step 306 to step 314, in which a collaborative NFT is minted. For example, distributed computer system 110 may execute project management logic 102 interoperating with data storage logic 106, the logics programmed to cause minting of a collaborative NFT on main blockchain 140 or side blockchain 150. Minting the collaborative NFT comprises writing an immutable transaction to a node of a blockchain, wherein the node references the digital object embodying the composition prepared for auction by the originator and his or her co-collaborators. The digital object may be caused by distributed computer system 110 to be stored in the third-party database 130 or another data storage system. The collaborative NFT may be minted in compliance with the ERC-721 protocol. The authorship of the digital object may be specified by a smart contract as described further herein, including in section 2.2.1. The digital object may be associated with a dynamic digital animated frame as described further herein, including in section 2.2.2.

Minting a collaborative NFT as described herein allows for content creators to maintain sovereignty over their work while establishing collaborative provenance. When the NFT is minted, a public, immutable transaction record may be written to the block chain which establishes ownership of the corresponding digital object. The transaction record may provide for security in attribution for the artists and authenticity for all future buyers in a potentially long future chain of ownership. When the collaborative NFT is minted, a corresponding hash ID becomes fixed and unalterable, generating a unique and persistent identifier for the corresponding digital object. And collaborative or collective provenance being built into the NFT at the point of origination or the point of minting secures against fraud.

2.2.1 Smart Contracts

While a collaborative NFT may provide a proof of ownership over a composed digital object, a corresponding smart contract may provide a proof of authorship over that same object and a path to monetization. The digital content which is tied to the project ID may also be tied to the smart contract that governs the splitting of shares between the originator and the co-collaborators. The smart contract may serve a custodial function, storing funds related to the sales and royalties of collaborative NFTs securely until the funds are "pulled" from the smart contract according to the appropriate share distribution and rules built into the smart contract.

A smart contract may be understood to be a transaction protocol intended to automatically self-execute, verify, control or document legally relevant events pursuant to predetermined conditions. Smart contracts may facilitate complex transactions without needing a trusted intermediary. Using smart contracts in association with collaborative NFTs may lead to a reduction in arbitration or enforcement costs, as well as a reduction of losses due to fraudulent or accidental disruptions.

Technically speaking, a smart contract may be an instance of a class which is programmed to store and change various states according to certain rules. A smart contract related to a collaborative NFT may comprise a state specifying a distribution of authorship shares and an update function. The rules of the smart contract are hardcoded and transparent, pre-defined and published open source so that even the creator of the smart contract cannot change them. A smart contract may exist, for example on a Polygon or Ethereum blockchain. In an embodiment, the smart contract is maintained on the same blockchain as the corresponding NFT. In an embodiment, the smart contract that handles an NFT stores a global template of a uniform resource identifier (URI) that points to an NFT metadata file, such as a json metadata file. Each NFT metadata file may comprise one or more links to digital assets of the NFT, including representations of the NFT. These assets may include: (1) digital image assets such as a jpeg, png, gif, WebP, tiff, psd, ai, or RAW files, (2) digital video assets such as MP4, MOV, WMV, FLV, AVI, AVCHD, WebM, or MKV files, (3) a gif animation potentially comprising frames of aforementioned digital assets, or (4) a 3D mode, such as a 3D model of a digital animated frame. In embodiments, one or more of said digital asset files are representations of the NFT. In embodiments, a third-part website such as a content host 160 may only need to communicate with a smart contract to obtain the global template of the URI or a token ID corresponding to the NFT in order to display the NFT or in order to display the NFT inside the animated digital frame. In embodiments, json metadata file contents, including the links to digital assets, may be subject to updates within the erc1155 standard.

2.2.2 Digital Animated Frames

In embodiments, a collaborative NFT may also comprise a reference to a digital animated frame that may be associated with a level of rarity, popularity, or prestige. The animated digital frame may be caused by distributed computer system 110 executing project management logic 102 interoperating with data storage logic 106 to be stored in the same database as the digital object associated with a collaborative NFT, or another data storage system. When the digital object is viewed by a user on a website, the digital object may be graphically displayed inside the digital animated frame. The frame may comprise still and/or animated digital imagery featuring various colors and designs. In embodiments, a default frame is created for the corresponding digital object when an NFT is minted. As the digital objected gains popularity, the frame may evolve. The frame may dynamically update based on the popularity of the digital object defined by a number of views or likes, or by another metric. The frame of a digital object which becomes a popular or viral video may evolve to become a gold frame. In embodiments, extremely popular digital objects may receive a rare, colorful frame. The functionality of the digital animated frame may be specified by the smart contract associated with the digital object; and, the smart contract may further comprise a pointer to the digital animated frame.

In embodiments, the evolution of the frame may be programmatically specified in advance in the smart contract by distributed computer system 110 interfacing with a decentralized Oracle system that communicates with a centralized API, as opposed to by direct update. Relevant popularity metrics comprising data or metadata may be programmatically pulled from websites (such as TIKTOK or INSTAGRAM) using API calls. The API calls may programmed to be done automatically, either periodically or upon set triggers. The Oracle system may employ a transparent Chainlink Bridge, wherein the parameters of the frame which may dynamically update are pre-defined. This may allow the frame to evolve (e.g., change in color, form, or animation) while being resistant to third-party tampering that is inconsistent with the smart contract protocol and embedded rules.

2.3 Auctioning a Collaborative NFT & Transfers of Ownership

In an embodiment, method, 300 continues from step 314 to step 316, wherein the collaborative NFT is auctioned online by the platform. Digital bids may be placed for ownership of the collaborative NFT. For example, distributed computer system 110 may execute programmed instructions to interface with client computing device 120 or app 122 to receive input specifying bids for the collaborative NFT being auctioned. The platform may provide a user with a cryptocurrency wallet when the user establishes an account on the platform, the wallet being associated with a unique user ID of the user. The winning bidder may pay for the NFT with cryptocurrency from their wallet or other currency. In some embodiments, the auction is actually a sale and the first user signifying a willingness to pay the listing price of the collaborative NFT is able to buy the collaborative NFT transmitting digital input to distributed computer system 110 through client computing device 120 or app 122.

In embodiments, method 300 may progress from step 316 to step 318, wherein ownership of the collaborative NFT is transferred to the winning bidder of the auction. A transfer of ownership may comprise a transaction being recorded on the blockchain specifying that the winning bidder is the owner of the collaborative NFT. Said transfer of ownership may be accomplished by distributed computer system 110 executing programmed instructions to record transactions on main blockchain 140 or side blockchain 150 or programmatically by another means. Depending on the terms of the auction, the transfer of ownership of the collaborative NFT may or may not comprise the transfer of copyrights in the corresponding digital object or any other rights. The transfer of ownership may programmatically occur concurrently with the payment, including by using a smart contract.

2.4 Monetization

In embodiments, method 300 may be programmed to progress from step 318 to step 320, at which point the originator and the co-collaborators may pull an initial payment from the platform. For example, distributed computer system 110 may execute programmed instructions to interface with client computing device 120 or app 122 to receive digital input specifying a desire to retrieve monies or cryptocurrency earned through online auction or sale of a collaborative NFT on the platform. In an embodiment, when the auction concludes, the payment or an equivalently valued amount of cryptocurrency may be deposited in a smart contract associated with the collaborative NFT, the smart contract existing on the same blockchain as the collaborative NFT. The platform may programmatically set aside a predetermined amount of the payment as a commission to the platform, which may be 5% or another amount. The originator and co-collaborators may then pull the proceeds from the smart contract to their respective cryptocurrency wallets, corresponding to the amount of authorship shares held by the respective content creator in the smart contract, for example, after being prompted to do so by distributed computer system 110 executing instructions formatted to cause a prompt to be displayed on client computing device 120 or app 122. An operator of the platform may pull the commission to a platform wallet, or it may be done automatically by the platform by distributed computer system 110 executing instructions.

In embodiments, method 300 may be programmed to progress from step 320 to step 322 when there is a resale of the collaborative NFT. In such cases, the originator and co-collaborators may programmatically receive a royalty, such as a 10% royalty or another royalty amount with respect to the resale price. The royalty may be deposited in the same smart contract associated with the collaborative NFT, and the originator and co-collaborators may similarly pull the royalty amount from the smart contract to their cryptocurrency wallets. The platform may similarly programmatically receive a 5% commission on the resale, based on the resale price. The operator of the platform may pull the resale commission to the platform wallet or it may be done automatically by the platform by distributed computer system 110 executing instructions.

Methods disclosed herein may provide a significant advantage over the state of the art by streamlining and automating the contractual and logistical process of splitting authorship, and resultant revenue, related to a digital object between multiple parties. By creating a collective NFT, each content creator may easily obtain the initial proceeds and future royalties that flow from their respective creative contributions. Further, this disclosure teaches, among other things, a trust-free and transparent process, operating under full programmatic control, that reduces the opportunity for fraud in an NFT minting process by using an associated smart contract. These systems and methods may extend and apply to any type of digital content, including serialized content such as serialized television; and, they may even streamline the process of music licensing.

2.5 Gamification

In an embodiment, the platform may gamify the process of creating, obtaining, monetizing, or viewing NFTs or collaborative NFTs. Gamification may be thought of as an application of game like elements to marketing or operations to enhance user engagement related to a product or service. The digital animated frames described herein could be considered gamification because the frames reward promotion or popularization of the digital content/digital object embodied in an NFT or collaborative NFT with a different or more rare cosmetic skin. The use of Geo-NFTs and Mystery NFTs represent other methods of gamification for NFTs or collaborative NFTs which may be provided by the platform.

In an embodiment, a Geo-NFT is a location based NFT or location based collaborative NFT. A plurality of Geo-NFTs, or even hundreds or thousands of Geo-NFTs may be associated with a single smart contract. When a platform user visits a particular location in the physical world (e.g., an affiliated store location), that user may be able to obtain a Geo-NFT which is then associated with their account. A redemption trigger could be established through geofencing techniques or through the user scanning a QR code using the client computing device 120. The QR code may be a time-based, circulating QR code shown on a display device. In these embodiments, when a current QR code is scanned, then a subsequent QR code is generated and displayed. This may prevent the QR code from being disseminated online, ensuring that the scanning user is actually in the designated physical location.

A Geo-NFT may drive user engagement and encourage users to interact with a partnered entity by establishing a credibility-building mechanism for a platform user to demonstrate that they were at a particular location at a particular time (e.g., at an initial product launch, a movie premier, or a concert tour stop). Platform users may be programmatically notified of an ability to obtain a Geo-NFT by distributed computer system 110 executing instructions formatted to cause display, by client computing device 120 or app 122, of a callout comprising a banner or other image, an email message, a text message, a social media post or direct message, or other method. In embodiments, ownership of a collection of related Geo-NFTs may be recorded on a topic-based digital passport which may be publicly displayed online by a user of the platform to other platform users. Obtaining all or a majority of Geo-NFTs on a digital passport may allow a user to display a badge indicating a Fan or SuperFan status on the platform.

In an embodiment, a Mystery NFT is an NFT or collaborative NFT that is not unveiled until bought. In other embodiments, the Mystery NFT is not programmatically unveiled until a set period of time has passed or a set date, or until the user receives the Mystery NFT. A plurality of Mystery NFTs, or even hundreds or thousands of Mystery NFTs may be associated with a single smart contract. In embodiments, a Mystery NFT associated with a particular content creator or brand may be provided to a user that has obtained a related Fan or SuperFan status. In an embodiment, a digital object associated with a Mystery NFT is not viewable on the internet before it is programmatically "unveiled" responsive to a time-based trigger.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
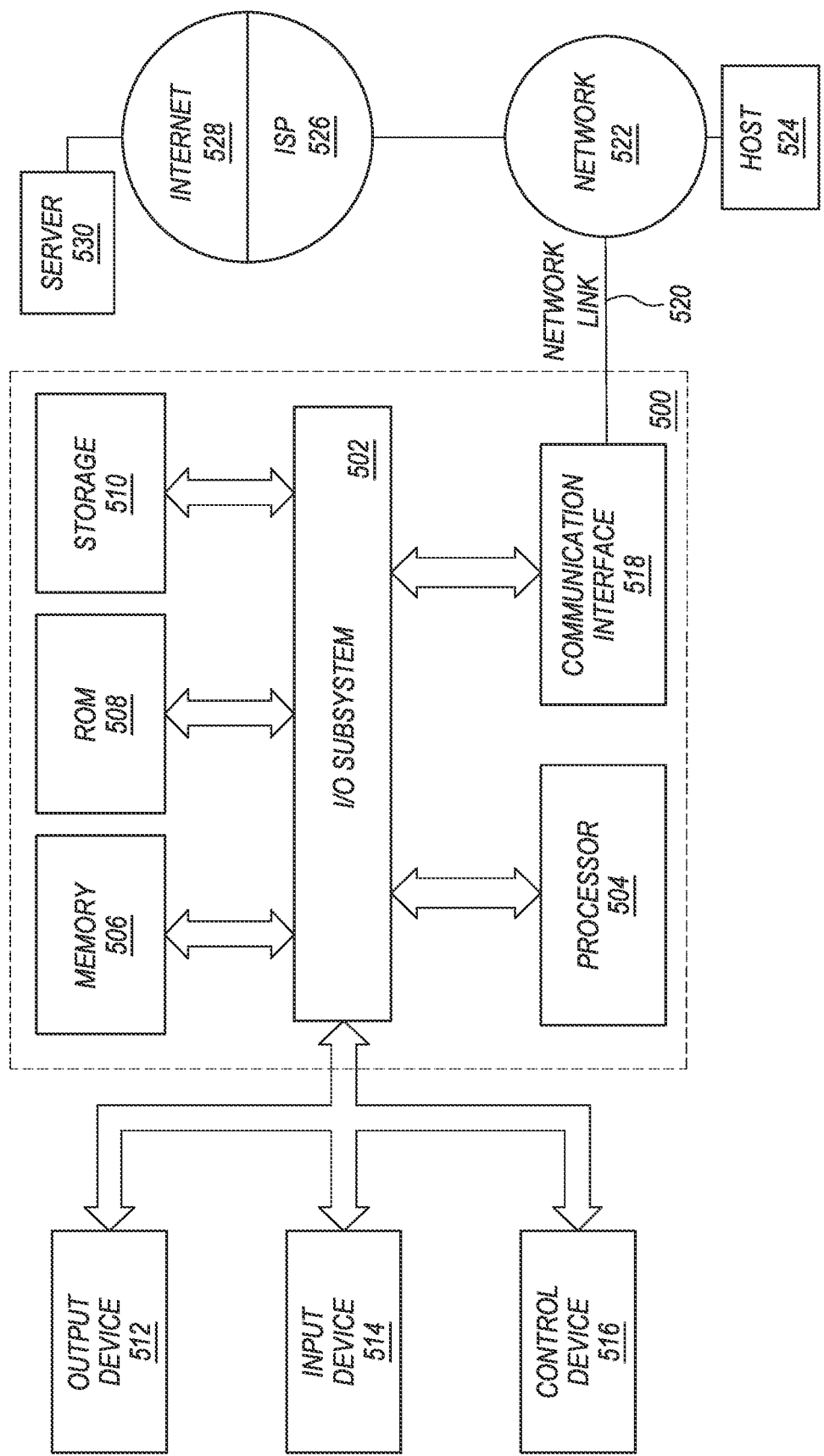
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, Internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   receiving and digitally storing a set of files uploaded by a plurality of users, each file comprising digital content;
   programmatically associating the set of files with a corresponding unique project identifier;
   receiving, from a user of the set of users, digital input specifying a final digital composition comprising information from at least one file of the set of files associated with the unique project identifier;
   digitally storing the final digital composition as a digital object in a database;
   receiving digital input from the plurality of users specifying an allocation of authorship shares, the allocation of authorship shares representing a distribution of ownership rights in the digital object;
   minting, on a blockchain, a non-fungible token (NFT) comprising a reference to the digital object;
   creating, on the blockchain, a smart contract specifying a fractional ownership of the digital object according to the allocation of authorship shares, the smart contract comprising a pointer to a metadata file associated with the non-fungible token, the metadata file comprising one or more links to one or more corresponding digital assets associated with the non-fungible token, each digital asset comprising a representation of the non-fungible token; and
   associating, by updating a state value of the smart contract according to an embedded rule of the smart contract, the digital object with an animated digital frame within which the digital object may be viewed online, the metadata file associated with the NFT comprising a link to the animated digital frame.

2. The method of claim 1, further comprising auctioning the NFT online and transferring ownership of the NFT, the NFT being minted according to the ERC-721 open standard and the NFT and the smart contract being recorded as transactions on an ETHEREUM blockchain.

3. The method of claim 1, the one or more digital assets comprising at least one of a digital video of the digital object being displayed inside the frame or a gif animation comprising video frames of the digital video.

4. The method of claim 1, the animated digital frame being programmatically configured to dynamically update based on a popularity of the digital object defined by popularity metadata associated with the digital object, the popularity metadata being related to at least one of a number of views or a number of likes of the digital object on a content host, the popularity metadata being received responsive to one or more automatic API calls to the content host.

5. The method of claim 1, the smart contract being associated with a plurality of NFTs that reference the digital object, and the smart contract comprising a pointer to each of the plurality of NFTs.

6. The method of claim 5, the NFT being obtainable only by a user that presently inhabits or previously inhabited a particular location in a physical world during a specified time period.

7. The method of claim 6, further comprising determining that the user presently inhabits or previously inhabited the particular location during the specified time period using a method comprising at least one of geofencing or the user scanning a QR code.

8. The method of claim 5, the NFT being viewable online only after the occurrence of a specified time-based trigger.

9. The method of claim 2, further comprising storing payments, less a commission, related to the auctioning of the NFT and any subsequent resales of the NFT in the smart contract; and, pulling, by a user of the plurality of users, personal payments from the smart contract to a personal cryptocurrency wallet associated with the user based on the user's fractional ownership of the NFT specified by the smart contract.

10. A system comprising:
one or more processors;
digital electronic memory coupled to the one or more processors and storing one or more sequences of stored program instructions which, when executed by the one or more processors, cause the one or more processors to execute:
receiving and digitally storing a set of files uploaded by a plurality of users, each file comprising digital content;
programmatically associating the set of files with a corresponding unique project identifier;
receiving, from a user of the set of users, digital input specifying a final digital composition comprising information from at least one file of the set of files associated with the unique project identifier;
digitally storing the final digital composition as a digital object in a database;
receiving digital input from the plurality of users specifying an allocation of authorship shares, the allocation of authorship shares representing a distribution of ownership rights in the digital object;
minting, on a blockchain, a non-fungible token (NFT) comprising a reference to the digital object;
creating, on the blockchain, a smart contract specifying a fractional ownership of the digital object according to the allocation of authorship shares, the smart contract comprising a pointer to a metadata file associated with the non-fungible token, the metadata file comprising one or more links to one or more corresponding digital assets associated with the non-fungible token, each digital asset comprising a representation of the non-fungible token; and
associating, by updating a state value of the smart contract according to an embedded rule of the smart contract, the digital object with an animated digital frame within which the digital object may be viewed online, the metadata file associated with the NFT comprising a link to the animated digital frame.

11. The system of claim 10, the instructions further executable to cause performance of auctioning the NFT online and transferring ownership of the NFT, the NFT being minted according to the ERC-721 open standard and the NFT and the smart contract being recorded as transactions on an ETHEREUM blockchain.

12. The system of claim 10, the one or more digital assets comprising at least one of a digital video of the digital object being displayed inside the frame or a gif animation comprising video frames of the digital video.

13. The system of claim 10, the animated digital frame being programmatically configured to dynamically update based on a popularity of the digital object defined by popularity metadata associated with the digital object, the popularity metadata being related to at least one of a number of views or a number of likes of the digital object on a content host, the popularity metadata being received responsive to one or more automatic API calls to the content host.

14. The system of claim 10, the smart contract being associated with a plurality of NFTs that reference the digital object, and the smart contract comprising a pointer to each of the plurality of NFTs.

15. The system of claim 14, the NFT being obtainable only by a user that presently inhabits or previously inhabited a particular location in a physical world during a specified time period.

16. The system of claim 15, the instructions further executable to cause performance of determining that the user presently inhabits or previously inhabited the particular location during the specified time period using a method comprising at least one of geofencing or the user scanning a QR code.

17. The system of claim 14, the NFT being viewable online only after the occurrence of a specified time-based trigger.

18. The system of claim 11, the instructions further executable to cause performance of storing payments, less a commission, related to the auctioning of the NFT and any subsequent resales of the NFT in the smart contract; and, pulling, by a user of the plurality of users, personal payments from the smart contract to a personal cryptocurrency wallet associated with the user based on the user's fractional ownership of the NFT specified by the smart contract.

* * * * *